United States Patent
Tarumi

(10) Patent No.: US 9,052,855 B2
(45) Date of Patent: Jun. 9, 2015

(54) SYSTEM, CONTROL METHOD THEREFOR, CONTROL METHOD FOR INFORMATION PROCESSING APPARATUS, AND NON-TRANSITORY COMPUTER-READABLE MEDIUM IN WHICH CLIENT AND SERVER CUSTOMIZE A PRINTER DRIVER IN COOPERATION WITH EACH OTHER

(71) Applicant: CANON KABUSHIKI KAISHA, Tokyo (JP)

(72) Inventor: Takeshi Tarumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 13/951,666

(22) Filed: Jul. 26, 2013

(65) Prior Publication Data

US 2014/0063520 A1 Mar. 6, 2014

(30) Foreign Application Priority Data

Aug. 31, 2012 (JP) ................................ 2012-192293

(51) Int. Cl.
*G06F 13/00* (2006.01)
*G06F 3/12* (2006.01)
*G06F 9/44* (2006.01)
*G06F 9/445* (2006.01)

(52) U.S. Cl.
CPC ............ *G06F 3/1225* (2013.01); *G06F 9/4411* (2013.01); *G06F 9/44505* (2013.01)

(58) Field of Classification Search
CPC ...................................................... G06F 9/4411
USPC ........................................................... 719/327
See application file for complete search history.

(56) References Cited

U.S. PATENT DOCUMENTS

2004/0215754 A1* 10/2004 Orleth et al. .................. 709/223
2012/0281251 A1* 11/2012 Salgado et al. .............. 358/1.15
2013/0246777 A1* 9/2013 Fukasawa .......................... 713/1

FOREIGN PATENT DOCUMENTS

JP 2006-309724 A 11/2006

* cited by examiner

*Primary Examiner* — Andy Ho

(74) *Attorney, Agent, or Firm* — Cowan, Liebowitz & Latman, P.C.

(57) ABSTRACT

A system for customizing a printer driver, comprises: an accepting unit configured to accept a customization setting for the printer driver; a detection unit configured to detect the printer driver from a database; a generation unit configured to generate a customized printer driver by applying the customization setting to the printer driver detected by the detection unit; and an attachment unit configured to generate a catalog file for the customized printer driver, and attach an electronic signature to the catalog file.

12 Claims, 13 Drawing Sheets

FIG. 5 iR ABC LIPS

| PAGE SETTING | FINISHING | PAPER FEED | PRINTING QUALITY | DEVICE SETTING |

401 — PAGE SETTING
402 — FINISHING
403 — PAPER FEED
404 — PRINTING QUALITY
405 — DEVICE SETTING

FAVORITE: DEFAULT SETTING (UPDATE) ▼    ADD    EDIT

OUTPUT METHOD: PRINTING ▼

DOCUMENT SIZE: A4 ▼
OUTPUT PAPER SIZE: SAME AS DOCUMENT SIZE ▼
COPY COUNT: 1 ▲▼ COPIES(1~9999)
PRINTING DIRECTION: A ⊙ PORTRAIT   A ○ LANDSCAPE
PAGE LAYOUT: 1 IN 1 (DEFAULT) ▼
☐ DESIGNATE RATIO:
RATIO: 100 ▲▼ %(25~200)

☐ STAMP
STAMP NAME: CONFIDENTIAL ▼    EDIT STAMP

USER DEFINED PAPER    PAGE OPTION    RESTORE DEFAULTS

SETTING CONFIRMATION

OK    CANCEL    APPLICATION    HELP

410 — SETTING CONFIRMATION

FIG. 6

CONTROL SETTING — 500

Tabs: COMMON (501) | PAGE SETTING | FINISHING (502) | PAPER FEED (503) | PRINTING QUALITY (504) | DEVICE SETTING (505)

CONTROL LIST:

| | CONTROL | SETTING |
|---|---|---|
| ☑ | Profile | ENABLED |
| ☑ | Add Profile | ENABLED |
| ☑ | Edit Profile | ENABLED |
| ☑ | Job Opretions | ENABLED ▽ — 506 |
| ☐ | Secure Print | ENABLED |
| ☑ | Secure Print Settings....Store Destination | DISABLED |
| ☐ | Store | NON-DISPLAY |
| ☐ | Store and Print | ENABLED |
| ☐ | Promote Print | ENABLED |
| ☐ | Interrupt Print | ENABLED |
| ☐ | Edit and Preview | ENABLED |
| ☑ | Lock | ENABLED |

[ ALL ENABLE ] [ ALL DISABLE ] [ ALL NON-DISPLAY ]

[ OK ] [ CANCEL ] [ HELP ]

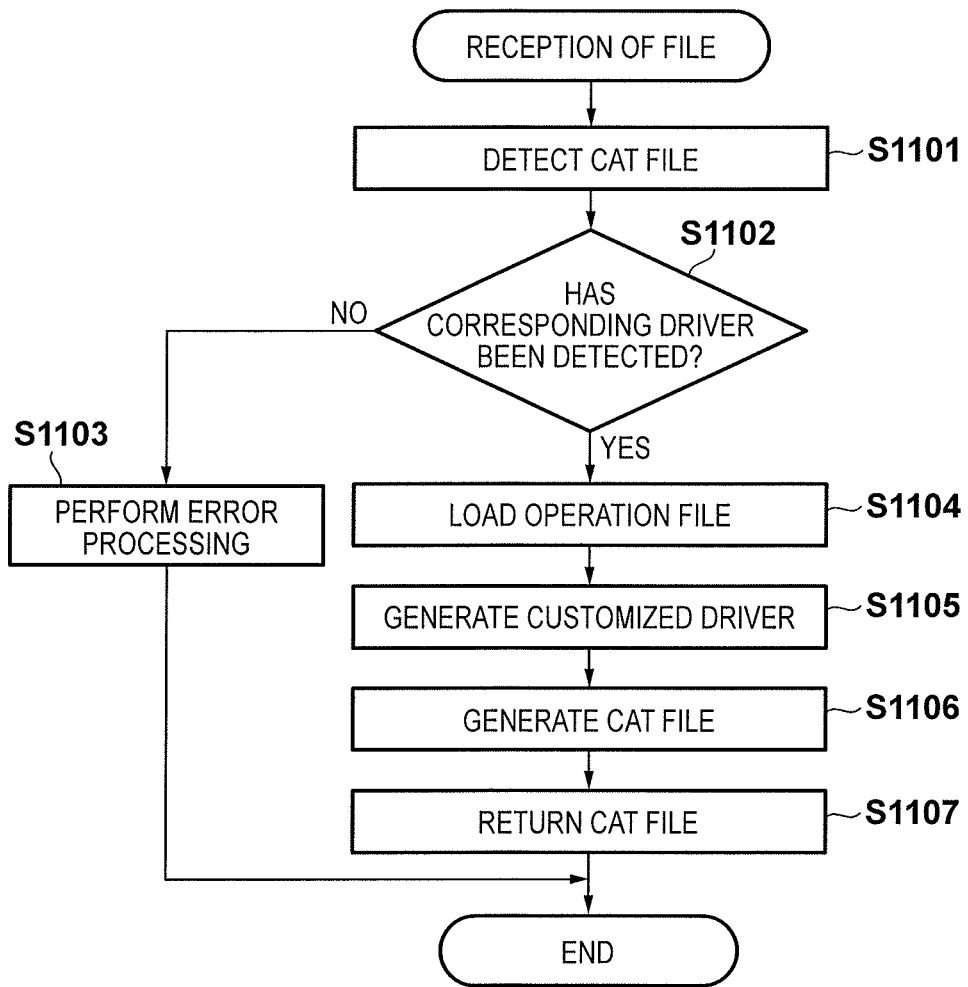
F I G. 11

F I G. 12
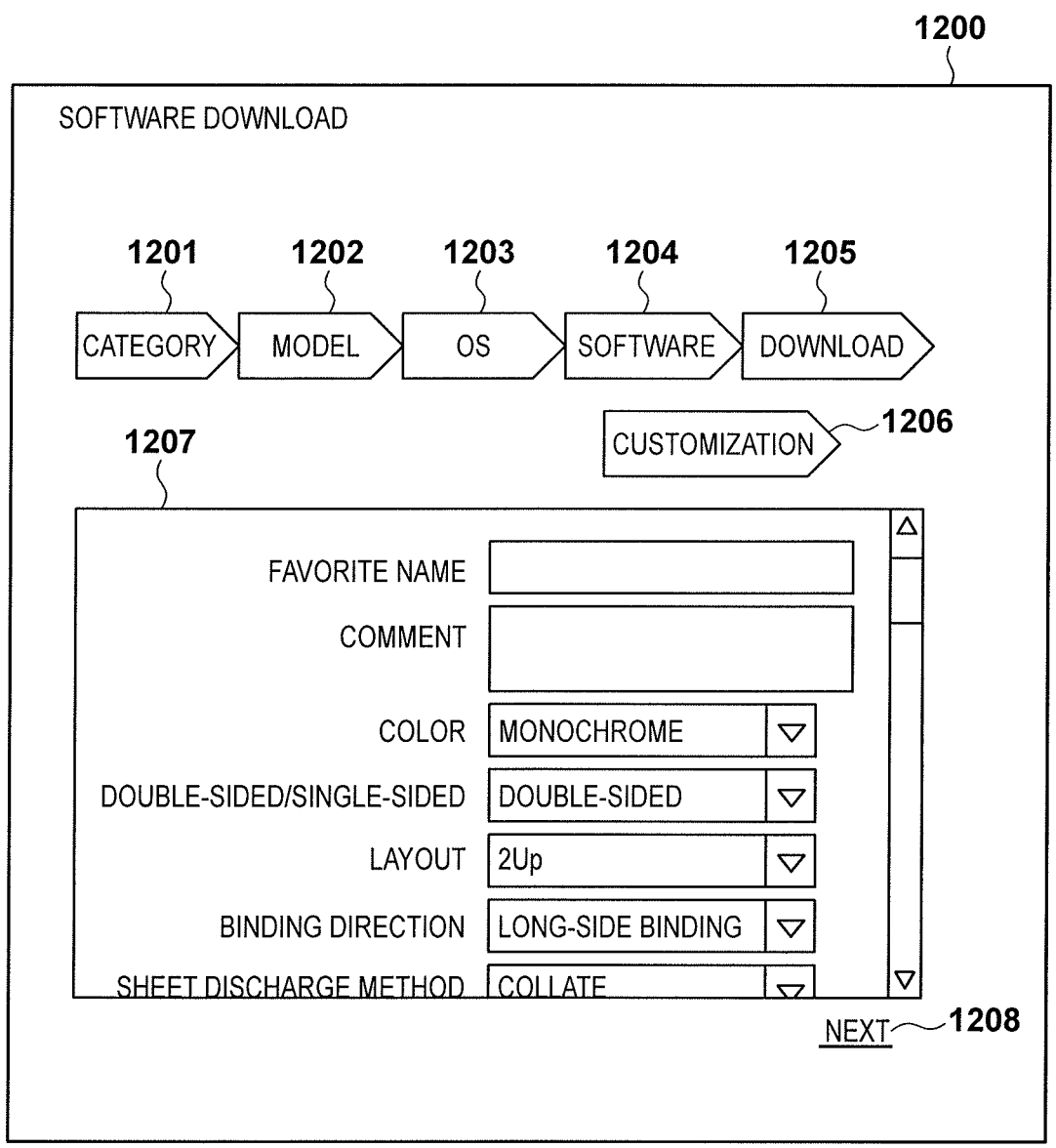

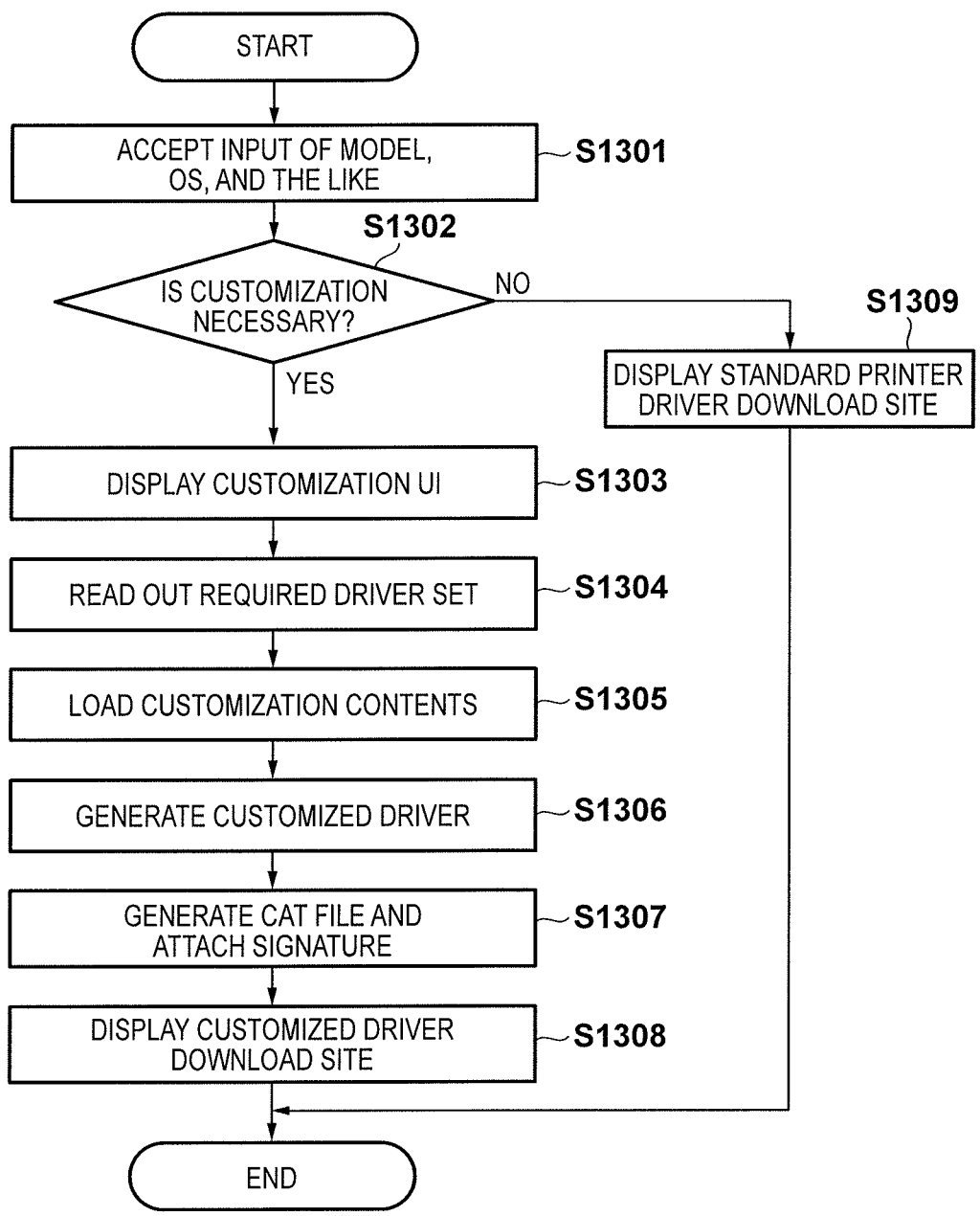

SYSTEM, CONTROL METHOD THEREFOR, CONTROL METHOD FOR INFORMATION PROCESSING APPARATUS, AND NON-TRANSITORY COMPUTER-READABLE MEDIUM IN WHICH CLIENT AND SERVER CUSTOMIZE A PRINTER DRIVER IN COOPERATION WITH EACH OTHER

BACKGROUND OF THE INVENTION

1. Field of the Invention

The present invention relates to a system for customizing a driver for a printing apparatus, a control method for the system, a control method for an information processing apparatus, and a non-transitory computer-readable medium.

2. Description of the Related Art

A typical program for controlling a printing apparatus such as a printer is a printer driver. A file set of a printer driver offered by a provider generally includes a CAT file (catalog file) for assuring the file set. An electronic signature issued by a provider or the like is generally attached to a CAT file (for example, Microsoft, Windows Logo Program [online], [searched Aug. 3, 2012], Internet, see <URL:http://msdn.microsoft.com/ja-jb/library/windows/hardware/gg463010.aspx>).

A user often wants to customize the setting contents of a printer driver in accordance with the installation environment of a printing system. In particular, recently, the use modes of the printer driver have diversified along with various installation environments of the printing system, and customization requests for the printer driver are increasing. To cope with these requests, there are provided printer driver customization techniques for changing default setting values and input control in a printer driver interface (to be simply referred to as an IF hereinafter) (for example, Japanese Patent Laid-Open No. 2006-309724).

According to the method of Japanese Patent Laid-Open No. 2006-309724, customization of a printer driver changes the file set of the printer driver, and the electronic signature attached to the CAT file undesirably becomes meaningless.

To solve this problem, a method of attaching an electronic signature again is available. However, every time customization is performed, it is necessary to generate a CAT file again for the file set of the customized printer driver and to attach an electronic signature to the CAT file, requiring time-consuming operation and extra cost.

SUMMARY OF THE INVENTION

According to one aspect of the present invention, there is provided a system in which a client and a server customize a printer driver in cooperation with each other, the client comprising an accepting unit configured to accept a customization setting for the printer driver, a generation unit configured to generate customization data based on an input of the customization setting, a communication unit configured to transmit the customization data and a first catalog file of the printer driver to the server, and receive a second catalog file as a response, and a unit configured to generate a customized printer driver by applying the customization data to the printer driver, and attaching the second catalog file to the printer driver, and the server comprising a reception unit configured to receive the customization data and the first catalog file from the client, a detection unit configured to detect a corresponding printer driver from a database using the received first catalog file as a key, a generation unit configured to generate a customized printer driver by applying the received customization data to the printer driver detected by the detection unit, an attachment unit configured to generate a second catalog file for the customized printer driver, and attach an electronic signature to the second catalog file, and a unit configured to transmit the second catalog file attached with the electronic signature by the attachment unit to the client.

According to another aspect of the present invention, there is provided a system for customizing a printer driver, comprising: an accepting unit configured to accept a customization setting for the printer driver; a detection unit configured to detect the printer driver from a database; a generation unit configured to generate a customized printer driver by applying the customization setting to the printer driver detected by the detection unit; and an attachment unit configured to generate a catalog file for the customized printer driver, and attach an electronic signature to the catalog file.

According to another aspect of the present invention, there is provided a control method for a system in which a client and a server customize a printer driver in cooperation with each other, comprising: in the client, an accepting step of accepting a customization setting for the printer driver; a generation step of generating customization data based on an input of the customization setting; a communication step of transmitting the customization data and a first catalog file of the printer driver to the server, and receiving a second catalog file as a response; and a step of generating a customized printer driver by applying the customization data to the printer driver, and attaching the second catalog file to the printer driver; and in the server, a reception step of receiving the customization data and the first catalog file from the client; a detection step of detecting a corresponding printer driver from a database using the received first catalog file as a key; a generation step of generating a customized printer driver by applying the received customization data to the printer driver detected in the detection step; an attachment step of generating a second catalog file for the customized printer driver, and attaching an electronic signature to the second catalog file; and a step of transmitting the second catalog file attached with the electronic signature in the attachment step to the client.

According to another aspect of the present invention, there is provided a control method for an information processing apparatus which customizes a printer driver in cooperation with a server, comprising: an accepting step of accepting a customization setting for the printer driver; a generation step of generating customization data based on an input of the customization setting; a communication step of transmitting the customization data and a first catalog file of the printer driver to the server, and receiving a second catalog file as a response; and a step of generating a customized printer driver by applying the customization data to the printer driver, and attaching the second catalog file to the printer driver.

According to another aspect of the present invention, there is provided a control method for an information processing apparatus which customizes a printer driver, comprising: a reception step of receiving a first catalog file and customization data for the printer driver from a client; a detection step of detecting a corresponding printer driver from a database using the received first catalog file as a key; a step of generating a customized printer driver by applying the received customization data to the printer driver detected in the detection step; an attachment step of generating a second catalog file for the customized printer driver, and attaching an electronic signature to the second catalog file; and a step of transmitting the second catalog file attached with the electronic signature in the attachment step to the client.

According to another aspect of the present invention, there is provided a non-transitory computer-readable medium storing a program for causing a computer to function as an accepting unit configured to accept a customization setting for a printer driver, a generation unit configured to generate customization data based on an input of the customization setting, a communication unit configured to transmit the customization data and a first catalog file of the printer driver to a server, and receive a second catalog file as a response, and a unit configured to generate a customized printer driver by applying the customization data to the printer driver, and attaching the second catalog file to the printer driver According to another aspect of the present invention, there is provided a non-transitory computer-readable medium storing a program for causing a computer to function as a reception unit configured to receive a first catalog file and customization data for a printer driver from a client, a detection unit configured to detect a corresponding printer driver from a database using the received first catalog file as a key, a generation unit configured to generate a customized printer driver by applying the received customization data to the printer driver detected by the detection unit, an attachment unit configured to generate a second catalog file for the customized printer driver, and attach an electronic signature to the second catalog file, and a unit configured to transmit the second catalog file attached with the electronic signature by the attachment unit to the client.

According to another aspect of the present invention, there is provided a non-transitory computer-readable medium storing a program for causing a computer to function as an accepting unit configured to accept a customization setting for a printer driver, a detection unit configured to detect the printer driver from a database, a generation unit configured to generate a customized printer driver by applying the customization setting to the printer driver detected by the detection unit, and an attachment unit configured to generate a catalog file for the customized printer driver, and attach an electronic signature to the catalog file.

According to the present invention, even when customizing a printer driver, the file set of the printer driver including a CAT file attached with an electronic signature can easily be generated.

Further features of the present invention will become apparent from the following description of exemplary embodiments (with reference to the attached drawings).

BRIEF DESCRIPTION OF THE DRAWINGS

FIG. 5 is a view showing an example of the printer driver initial value setting UI of the customization tool;

FIG. 6 is a view showing an example of the printer driver setting change display setting UI of the customization tool;

FIG. 11 is a flowchart illustrating another example of server processing;

FIG. 12 is a view showing an example of a download site; and

FIG. 13 is a flowchart illustrating still another example of server processing.

DESCRIPTION OF THE EMBODIMENTS

Modes for carrying out the present invention will be described below with reference to the accompanying drawings.

System Arrangement

Figure 1:
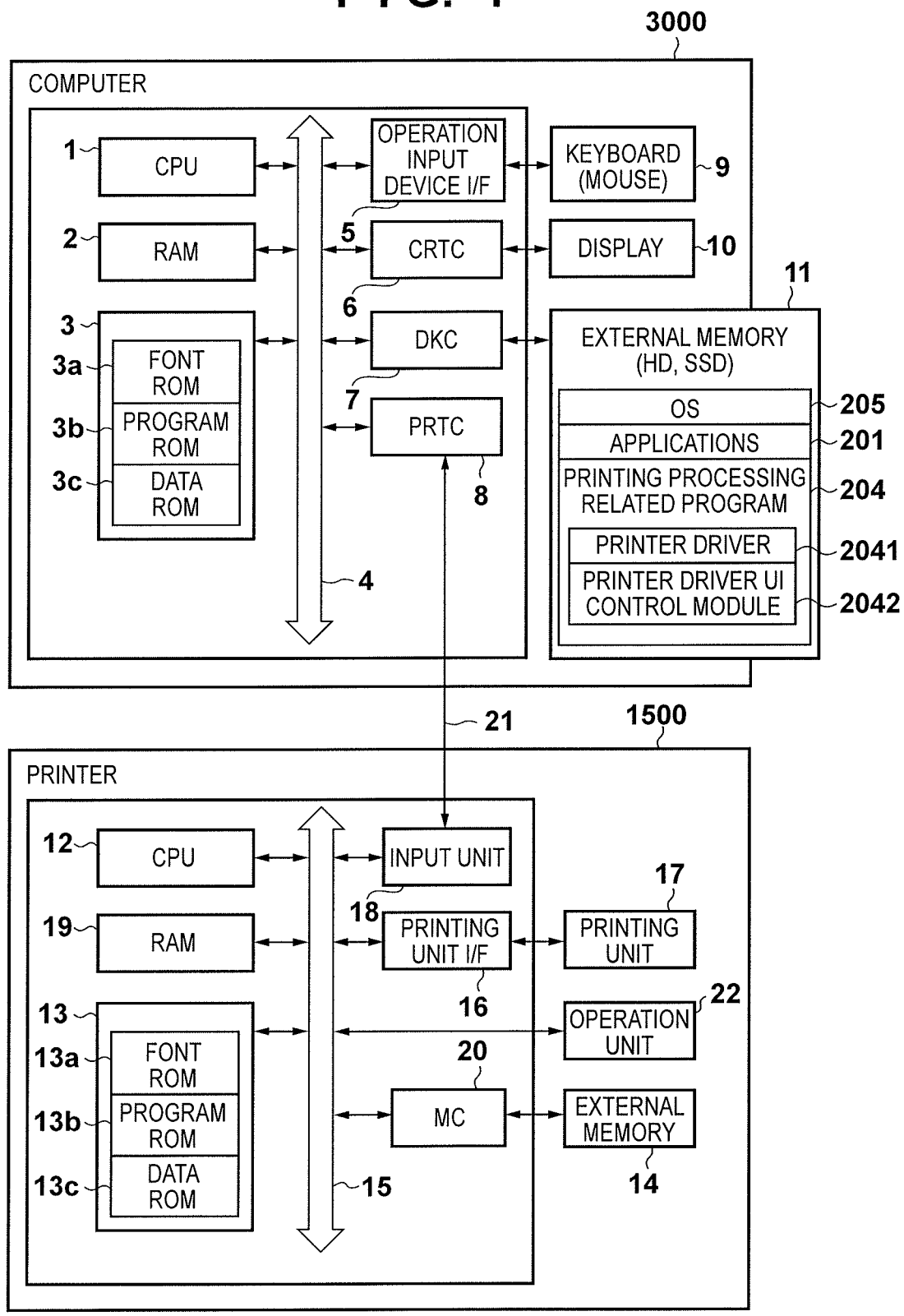
FIG. 1 is a block diagram showing the arrangement of a printing processing system according to an embodiment of the present invention.

FIG. 1 is a block diagram showing the arrangement of a computer serving as a general information processing apparatus and a printing system according to an embodiment of the present invention. Note that an arrangement including a single device or a plurality of devices can be used as far as a specific function of the present invention is performed. Alternatively, a system may be used in which services are connected to each other via a network to perform processing in cooperation with each other.

The printing processing system according to the embodiment includes a computer 3000 and a printer 1500 serving as an image forming apparatus which performs printing. The printer 1500 receives printing data from the computer 3000 and performs printing.

In the computer 3000, a CPU 1 comprehensively controls the respective devices connected to a system bus 4 in accordance with programs stored in a RAM 2. The RAM 2 also functions as a main memory, a work area, and the like for the CPU 1. A ROM 3 stores various programs and data, and includes a font ROM 3a which stores various types of fonts, a program ROM 3b which stores a boot program, a BIOS, and the like, and a data ROM 3c which stores various types of data.

A keyboard controller (KBC) 5 controls key inputs from a keyboard (KB) 9 and a pointing device (mouse) (not shown). A CRT controller (CRTC) 6 controls display on a CRT display (CRT) 10. A disk controller (DKC) 7 controls access to an external memory 11 such as a hard disk. A printer controller (PRTC) 8 is connected to the printer 1500 via a bidirectional interface 21 and performs communication control processing with the printer 1500.

The external memory 11 is, for example, a hard disk (HD), MO, Floppy® disk (FD), or the like. The external memory 11 stores an operating system program (to be referred to as an OS hereinafter) 205 and various applications (for example, a document processing application program for processing a document including a figure, image, text, and table) 201. The external memory 11 also stores user files, editing files, and the like in addition to a printing processing related program 204. The printing processing related program 204 is a program for generating printing data described using a page description language and is commonly used for a plurality of printers of the same model. The printing processing related program 204 includes a printer control command generation module (to be referred to as a printer driver hereinafter) 2041 and a printer driver user interface (UI) control module 2042.

The applications 201 including a customization tool program according to this embodiment and stored in the external memory 11 are loaded into the RAM 2 and executed by the CPU 1. The CPU 1 also executes processing of rasterizing outline fonts into, for example, the RAM 2, thereby allowing WYSIWYG (What You See Is What You Get) on the CRT 10. Note that the customization tool program according to this embodiment is a program used to customize various settings of a printer driver by the user. The customization tool will be described in detail later.

The CPU 1 opens a variety of registered windows based on commands instructed by a mouse cursor (not shown) on the CRT 10 and executes various data processes. When the user executes printing, he/she can open a printing setting screen (controlled by the printer driver UI control module 2042) and make settings of printing processing for the printer driver 2041 including printer settings and printing mode selection.

The arrangement of the printer 1500 will be described below. A CPU 12 controls the overall operation of the printer 1500. A RAM 19 functions as a main memory, a work area, and the like for the CPU 12 and is also used as an output information rasterization area and an environment data storage area. The RAM 19 includes an NVRAM (nonvolatile RAM) area and can expand the memory capacity by connecting an optional RAM to an expansion port (not shown). A ROM 13 includes a font ROM 13a which stores various types of fonts, a program ROM 13b which stores control programs and the like executed by the CPU 12, and a data ROM 13c which stores various types of data.

An input unit 18 exchanges data with the computer 3000. A printing unit interface 16 controls an interface with a printing unit 17 serving as a printer engine.

A memory controller (MC) 20 controls access to an external memory 14. The external memory 14 includes a hard disk (HD), MO, Floppy® disk (FD), and IC card connected as optional memories. Furthermore, the external memory 14 stores font data, an emulation program, form data, and the like. Note that when the external memory 14 such as a hard disk is not connected to the printer 1500, the data ROM 13c of the ROM 13 stores information and the like used in the computer 3000. Note also that the number of external memories 14 is not limited to one, and a plurality of memories may be included. For example, a plurality of external memories 14 may be connected, which include an optional font card in addition to a built-in font card and store programs for interpreting the printer control languages of different language systems.

An operation unit 22 includes an operation panel on which operations by the user are accepted. Operation switches, LED indicators (not shown), and the like are arranged on the operation panel. An NVRAM (not shown) may be provided to store printer mode setting information from the operation panel.

The CPU 12 outputs an image signal as output information to the printing unit 17 (printer engine) via the printing unit interface 16 based on the control program or the like stored in the program ROM 13b of the ROM 13. The CPU 12 is communicable with the computer 3000 via the input unit 18. The CPU 12 receives printing data transmitted by the computer 3000 and can notify the computer 3000 of information in the printer 1500.

[Memory Map]

Figure 2:
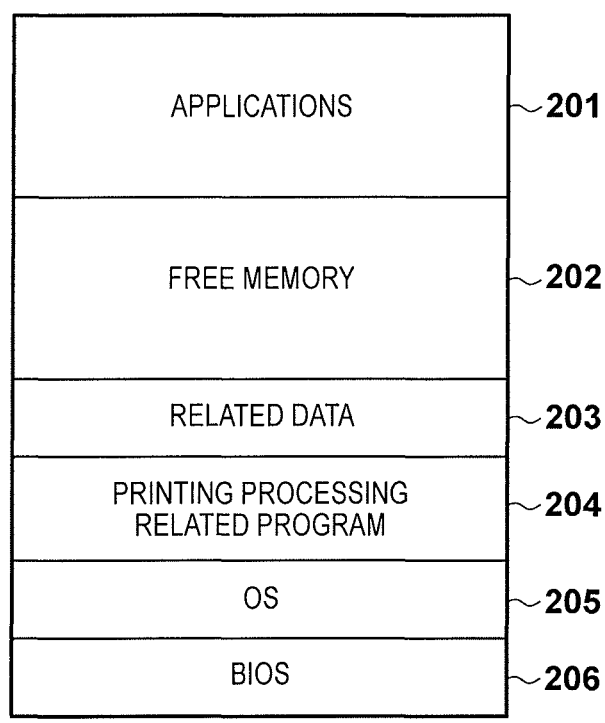
FIG. 2 is a view showing the memory map of a RAM in a host computer.

FIG. 2 is a view showing the memory map of the RAM 2 in a state in which a predetermined application and the printing processing related program 204 have been activated and a program and data have been loaded into the RAM 2 of the computer 3000.

The applications 201, the printing processing related program 204, and related data 203 are loaded into the RAM 2 in addition to a BIOS 206 and the OS 205, as shown in FIG. 2. In addition, a free memory area 202 is also allocated in the RAM 2. This allows the CPU 1 to execute the applications 201 and the printing processing related program 204. Note that the printer driver UI control module 2042 included in the printing processing related program 204 displays the printing setting screen on the CRT 10 in response to a printing setting instruction from the user, and accepts input settings from the user via the KB 9 and the like.

[Network Arrangement]

Figure 3:
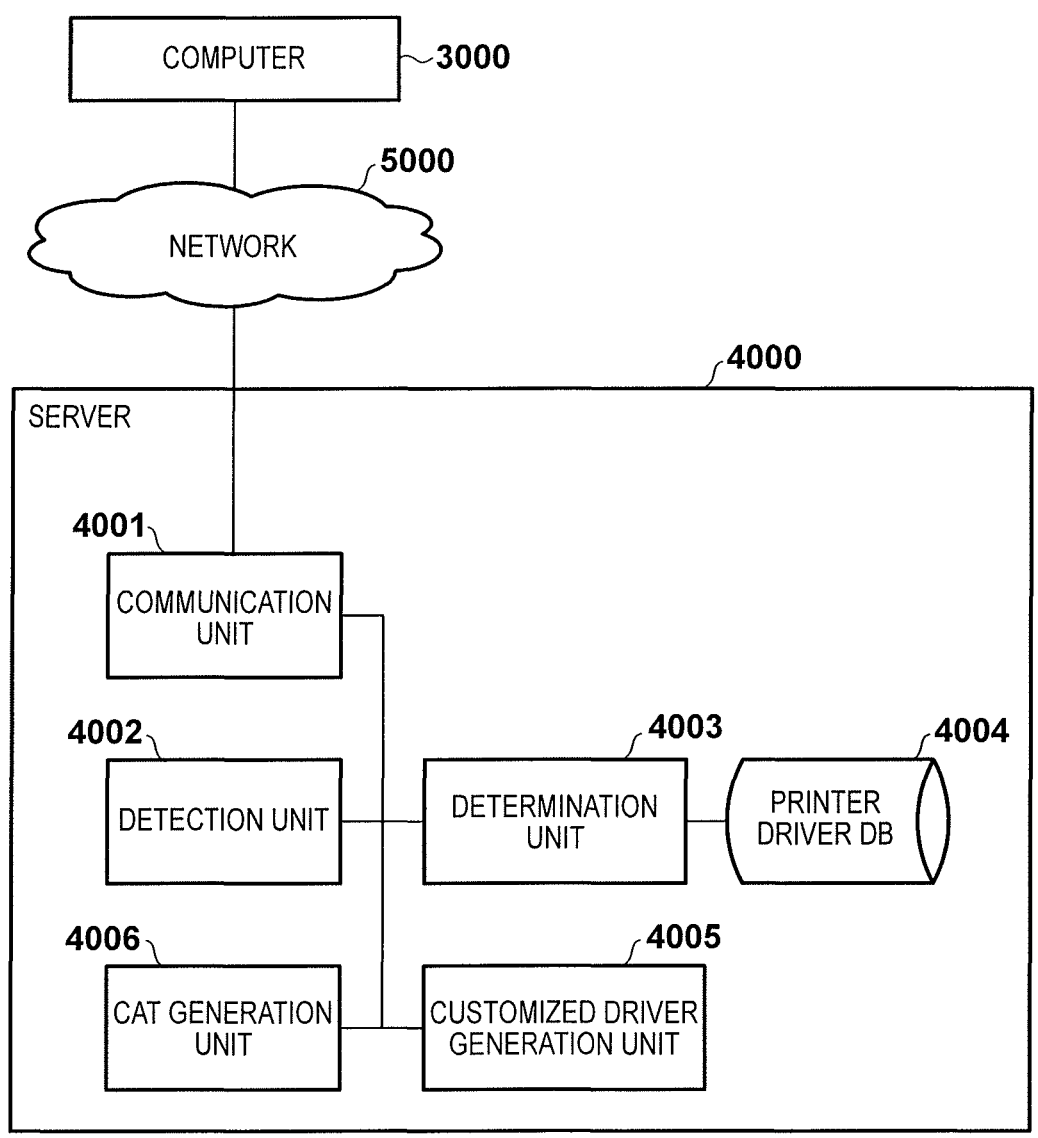
FIG. 3 is a block diagram showing an example of the system arrangement according to the embodiment of the present invention.

FIG. 3 is a block diagram schematically showing a network environment according to this embodiment. The computer 3000 serving as a client for generating a printing document and image is connected to a network 5000. Note that FIG. 3 illustrates only one computer, but a plurality of computers may be connected to the network. Furthermore, a management server (not shown) which manages client users and printers connected to the network 5000 may be connected. Although not shown in FIG. 3, one or a plurality of printers is connected to the network 5000. The types of networks are a PAN (Personal Area Network), LAN (Local Area Network), MAN (Metropolitan Area Network), WAN (Wide Area Network), and the like. Each device is connected via the network 5000 in FIG. 3. However, like cloud computing, servers and printers may be connected via the Internet to provide services.

In this embodiment, the arrangement of a printer driver customization system will be explained with reference to FIG. 3. Referring to FIG. 3, a program for implementing the system according to this embodiment runs on a server 4000 connected to the network 5000.

This program implements a communication unit 4001, detection unit 4002, determination unit 4003, printer driver DB 4004, customized driver generation unit 4005, and CAT generation unit 4006 on the server 4000. The communication unit 4001 performs communication via the network 5000. The detection unit 4002 performs file detection. The determination unit 4003 performs CAT file determination. The printer driver DB 4004 holds printer drivers released in the past. That is, the printer driver DB 4004 holds pieces of information of printer drivers installed on the computer 3000. The customized driver generation unit 4005 generates a customized printer driver. Note that in this specification, a printer driver before customization is simply referred to as a "printer driver", and a customized printer driver is referred to as a "customized driver". The CAT generation unit 4006 generates a CAT file (catalog file). The detailed operations of the respective units will be described later with reference to processing sequences.

[Customization Tool]

Figure 4:
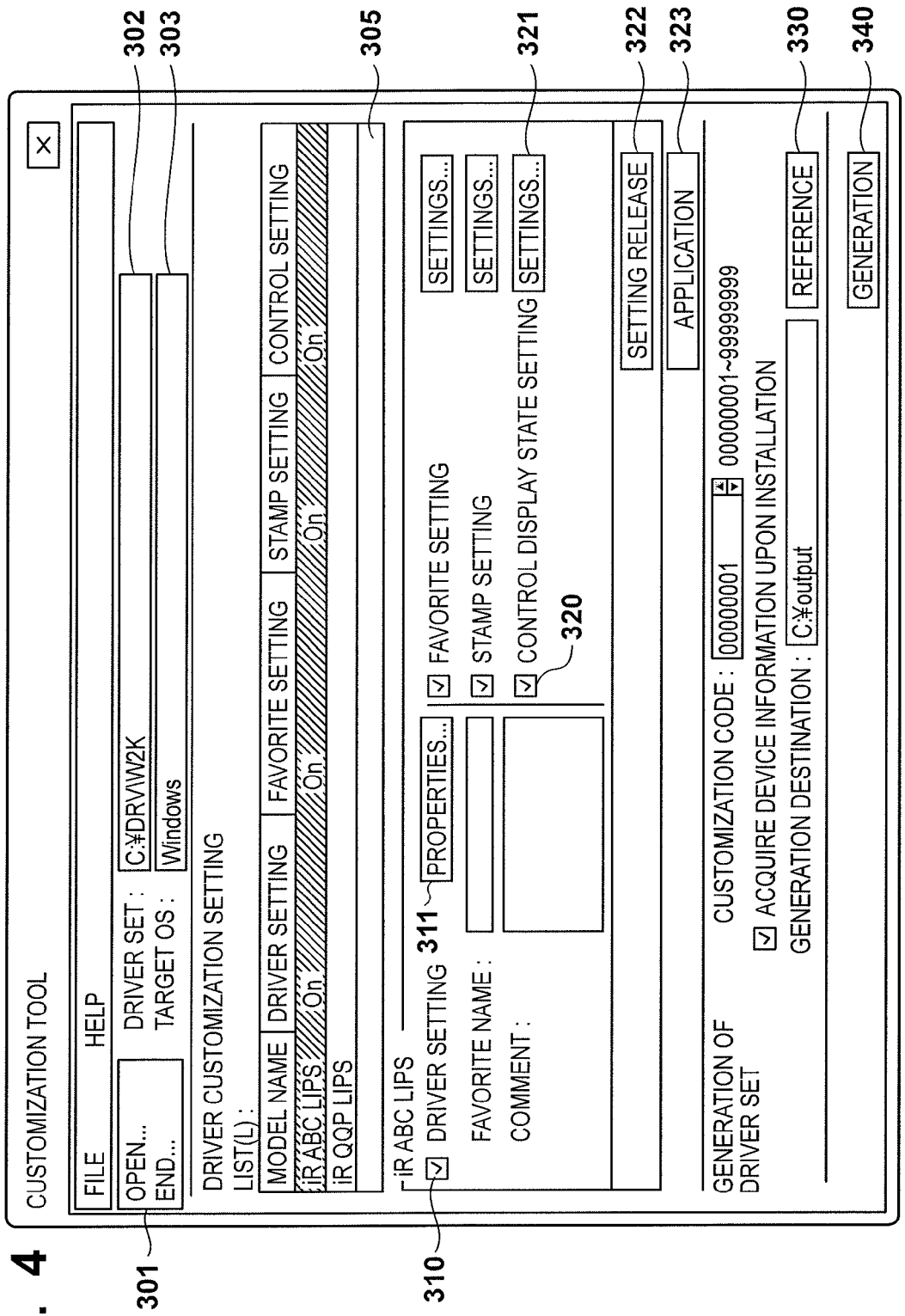
FIG. 4 is a view showing an example of the main UI of a customization tool.

FIG. 4 shows an example of the UI of a customization tool program running on the computer 3000. Note that the OS 205 in this embodiment is exemplified as the Windows® OS available from Microsoft®. The customization tool program runs on the Windows® OS.

Note that in the customization tool program, the operation of an API (Application Program Interface) corresponding to the OS can be simulated in accordance with a pseudo API without actually installing the printer driver. The operation contents of the printer driver can be controlled by changing or adding arguments for operating individual functions. The UI screen of the customization tool implements an accepting unit for accepting designation of various settings from the user.

When the user designates "open" of a menu 301 on the UI screen of FIG. 4, a dialogue (not shown) for designating a folder for storing the file set of the printer driver subjected to customization is displayed. This dialogue allows the user to designate the storage destination of the printer driver subjected to customization. The designated folder is displayed in a display field 302. The corresponding OS of the file set of the designated printer driver is displayed in a display field 303. In this case, "Windows" is displayed.

When a plurality of printer drivers corresponding to the models of printers are stored in the folder of the file set of one printer driver, the plurality of printer drivers are listed in a list view 305 at the time of generating a customized driver.

The customization tool determines whether pieces of customization information (customization data) are set in the respective printer drivers listed in the list view 305. If a printer driver set with customization data is present, a corresponding customized driver is generated. By using the pseudo API, the driver can be customized without installing the printer driver subjected to customization in correspondence with the OS.

The list view 305 displays the corresponding model of the printer driver subjected to customization and the identification for the customized information. When the user checks a check box 310, a button 311 is enabled. When the user presses the button 311, a customization printer driver UI (FIG. 5) is displayed. On the customization printer driver UI shown in FIG. 5, the user can designate initial settings such as initial value settings for printing settings (document properties) and device settings (printer properties).

When the user checks a check box 320, a setting button 321 is enabled. When the user presses the setting button 321, a UI (FIG. 6) for customizing a display method of control on the printer driver UI is displayed. The user can set the display method of control on the customization printer driver UI through the UI shown in FIG. 6.

When the user presses a setting release button 322, the settings about the customization set through the UI screen shown in FIG. 5 or 6 are released. Display of the identification in the list view 305 is released, and the state immediately after loading the file set of the printer driver can be restored.

When the user presses an application button 323 on the UI screen shown in FIG. 4, the settings about the customization set through the UI screen shown in FIG. 5 or 6 are held as customization information (customization data) in the application program (customization tool).

The customization tool, for example, holds the customization information in a file which describes driver installation information such as an INF file or a file which holds driver data information such as a UPD file. In this embodiment, a description will be provided using the INF file and UPD file.

When the user presses a reference button 330, a dialog (not shown) for designating the generation destination of a customized driver is displayed, thereby allowing the user to designate the generation destination of a customized driver. When the user makes various settings and then presses a generation button 340, a customized printer driver is generated in accordance with the settings designated by the user.

FIG. 5 shows an example of the screen arrangement of the customization printer driver UI displayed when the button 311 on the UI shown in FIG. 4 is pressed.

The customization tool functions as the setting unit of the computer 3000 under the control of the CPU 1. For example, the setting unit displays, on the CRT 10, a setting screen such as the UI screen shown in FIG. 5 for setting document properties and device properties.

Unlike the printer driver registered in Windows®, the UI screen of FIG. 5 displays, on one UI screen, a document property UI for document setting and a printer property UI for device setting. The customization tool displays the customization UI using a module of the printer driver.

On the UI screen shown in FIG. 5, a page setting tab 401, finishing tab 402, paper feed tab 403, and printing quality tab 404 can be displayed as a document property UI. Furthermore, a device setting tab 405 can be displayed as a printer property UI. The user can set initial values of document properties and those of printer properties through the respective UIs. Settings which cannot be customized are grayed out like a button 410 so as not to accept a setting input from the user.

FIG. 6 is a view showing an example of a UI for setting display/non-display control for setting items on the UIs provided by the printer driver. This UI is displayed on the CRT 10 of the computer 3000 by pressing the setting button 321 shown in FIG. 4. In the example shown in FIG. 6, it is possible to select control settings under a page setting tab 501, finishing tab 502, paper feed tab 503, printing quality tab 504, and device setting tab 505.

In the control setting, display control of each item settable on the UIs (401 to 405) in FIG. 5 can be set. In addition to display/non-display, enabling/disabling can be set when a corresponding item is displayed. In a common tab 500, it is possible to select display control settings for setting items common to the UIs. Note that the setting screens and setting items shown in FIGS. 5 and 6 are not limited to the above ones. Other items may be added as long as items settable in FIG. 5 are associated with those in FIG. 6 so as to set display/non-display of control.

[Operation Procedure]

The basic operation of the customization tool will be described with reference to FIG. 7. The customization tool executed by the CPU 1 of the computer 3000 mainly executes the basic operation.

When the user starts the customization tool, the customization tool performs initialization processing, and displays the UI screen shown in FIG. 4 on the CRT 10 (step S701). The customization tool acquires the storage position of the file set of the printer driver by user designation (step S702).

The customization tool checks, in the file set of the printer driver, the description contents of the INF file in which installation information is described (step S703). After that, the customization tool determines based on the checked description contents whether the file set of the printer driver corresponds to itself (step S704). If the file set does not correspond to the customization tool (NO in step S704), the customization tool performs error processing in step S709, and the process returns to step S702. The customization tool stands by for input of the file set of the printer driver from the user.

If the file set corresponds to the customization tool (YES in step S704), the customization tool displays the UI screen of the printer driver shown in FIG. 5 or 6, and accepts customization settings from the user (step S705).

Settings input through the screens shown in FIGS. 4 to 6 are customization data, that is, data included in the file set of the customized driver. The customization data are set in a data file (for example, a GPD (Generic Printer Description) file) readable by the printer driver.

When the printer driver is installed and becomes operable, it loads the setting values from the data file. That is, by reflecting the customized values on the data file, the driver can use the customized setting values. If, for example, preset setting values often used are reflected on the printer driver in advance, the setting values often used are set in the printer driver by only installing the customized driver.

The customization tool receives a customized driver generation instruction from the user via the generation button 340 shown in FIG. 4 (step S706). The customization tool generates a data file and INF file for the printer driver in accordance with the generation instruction, and executes customized driver generation processing (step S707). After that, upon receiving a customization tool end instruction from the user (step S708), the customization tool terminates its operation.

First Embodiment

Figure 8:
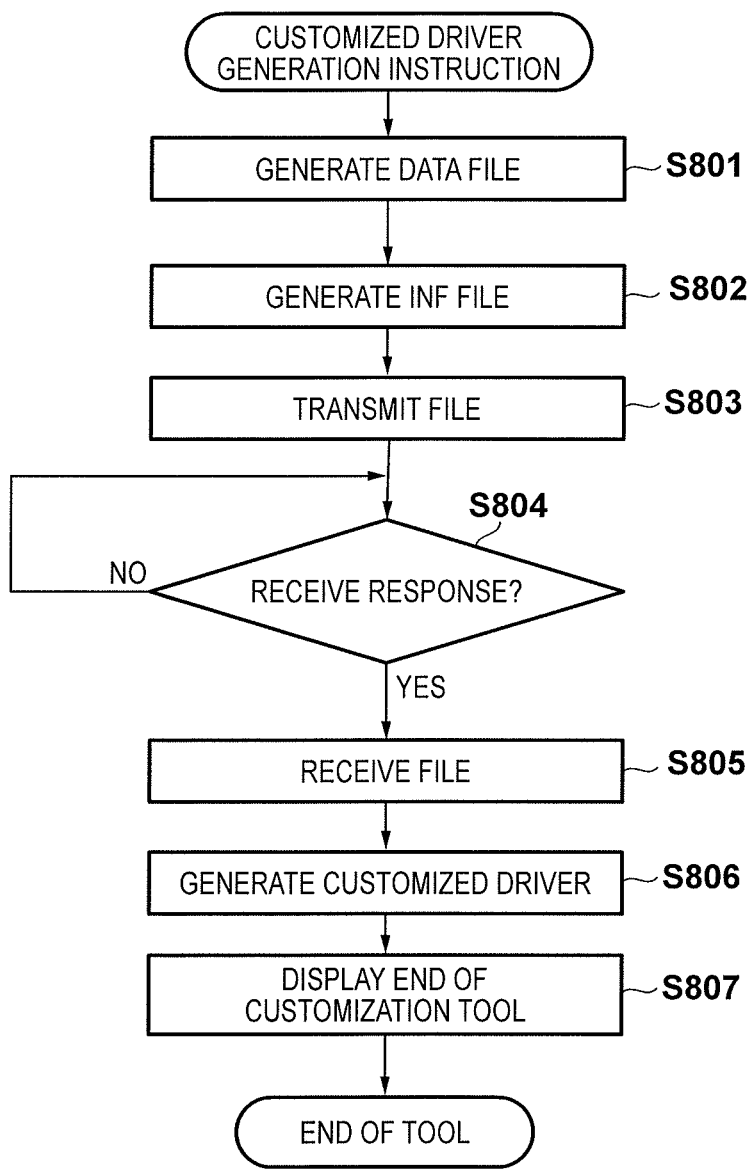
FIG. 8 is a flowchart illustrating an example of computer processing.
Figure 9:
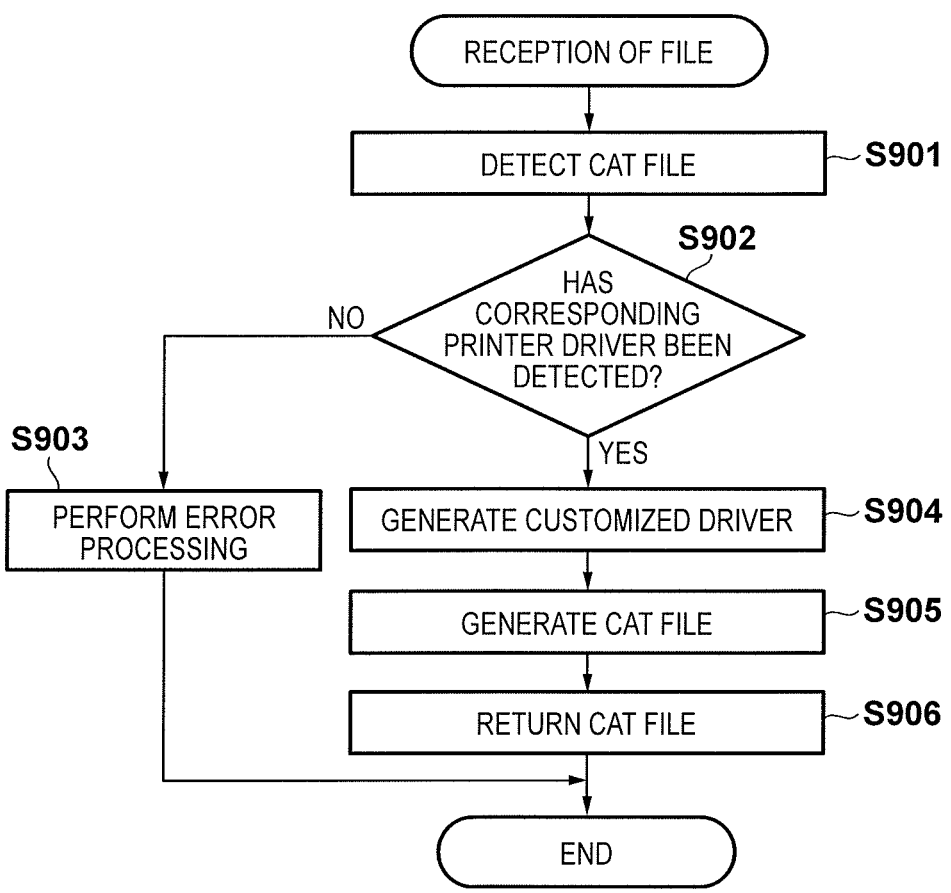
FIG. 9 is a flowchart illustrating an example of server processing.

As an embodiment of the present invention, a system for attaching a CAT file attached with an electronic signature to a customized driver will be described with reference to flowcharts shown in FIGS. 8 and 9. These flowcharts correspond to processing in step S707 of FIG. 7. Note that the flowchart of FIG. 8 illustrates processing on the computer 3000 side and the flowchart of FIG. 9 illustrates processing on the server 4000 side.

In step S801, a customization tool executes data file generation processing based on setting values designated by the user. The customization tool generates an INF file (step S802). The customization tool acquires a CAT file included in the file set of a printer driver before customization, and transmits it to the server 4000 together with the generated data file and INF file (step S803). The transmitted CAT file corresponds to the printer driver before customization. Note that in this specification, that CAT file is also referred to as a first catalog file for descriptive convenience.

The customization tool stands by for reception of a response from the server 4000 (step S804). Upon receiving a file generation completion notification as a response (YES in step S804), the customization tool receives a CAT file generated in the server 4000 (step S805). The CAT file which is received as a response to file transmission corresponds to the customized driver after customization, and has been attached with an electronic signature. Note that in this specification, that CAT file is also referred to as a second catalog file for descriptive convenience. Note also that if an error notification is received from the server 4000, the customization tool displays it on the UI screen.

The customization tool generates a customized driver (step S806). At this time, the customization tool generates a customized driver by replacing the data file, INF file and CAT file of the file set of the printer driver before customization by the data file generated in step S801, the INF file generated in step S802, and the CAT file received from the server 4000, and applying them. The customization tool then accepts an end instruction from the user (step S807), thereby terminating the flowchart.

The processing of the server 4000 will now be described with reference to the flowchart of FIG. 9. The flowchart of FIG. 9 starts when a communication unit 4001 receives the INF file, data file, and CAT file transmitted from the computer 3000 in step S803 of FIG. 8. This processing procedure is implemented when the CPU controls each unit of the server 4000 shown in FIG. 3.

A detection unit 4002 detects the CAT file from the files received by the communication unit 4001 (step S901), and transfers the CAT file to a determination unit 4003. The received CAT file corresponds to the printer driver before customization, as described above. The determination unit 4003 acquires, from the CAT file, information for specifying the printer driver before customization, such as property information and internal hash values. Based on the acquired information, the determination unit 4003 detects the corresponding printer driver from a printer driver DB 4004 (step S902).

If the printer driver before customization cannot be detected (NO in step S902), the determination unit 4003 executes error processing (step S903). After that, the communication unit 4001 returns an error to the computer 3000, thereby terminating the processing procedure.

If the printer driver before customization is detected (YES in step S902), a customized driver generation unit 4005 generates a customized driver (step S904). At this time, the customized driver generation unit 4005 generates a customized driver by replacing the data file and INF file of the file set of the detected printer driver by the data file and INF file received from the computer 3000. A CAT generation unit 4006 generates a CAT file corresponding to the generated customized driver, and attaches an electronic signature to it (step S905). Note that a method of attaching an electronic signature corresponding to a CAT file is not specifically limited. The communication unit 4001 transmits the generated CAT file to the computer 3000 (step S906). After that, the processing procedure ends.

According to the present invention, it is possible to generate a file set of a customized driver including a CAT file attached with an electronic signature without holding authentication information such as a private key in the customization tool on the client side.

Furthermore, files to be transmitted from the computer to the server are limited to some data (in this case, the data file, INF file, and CAT file) instead of the file set of the driver, thereby reducing the network load. Data to be transmitted from the server to the computer is also limited to the CAT file, thereby reducing the network load.

It is also possible to prevent mistakes while maintaining uniqueness by using the CAT file as a key when the server searches the database.

Second Embodiment

Figure 10:
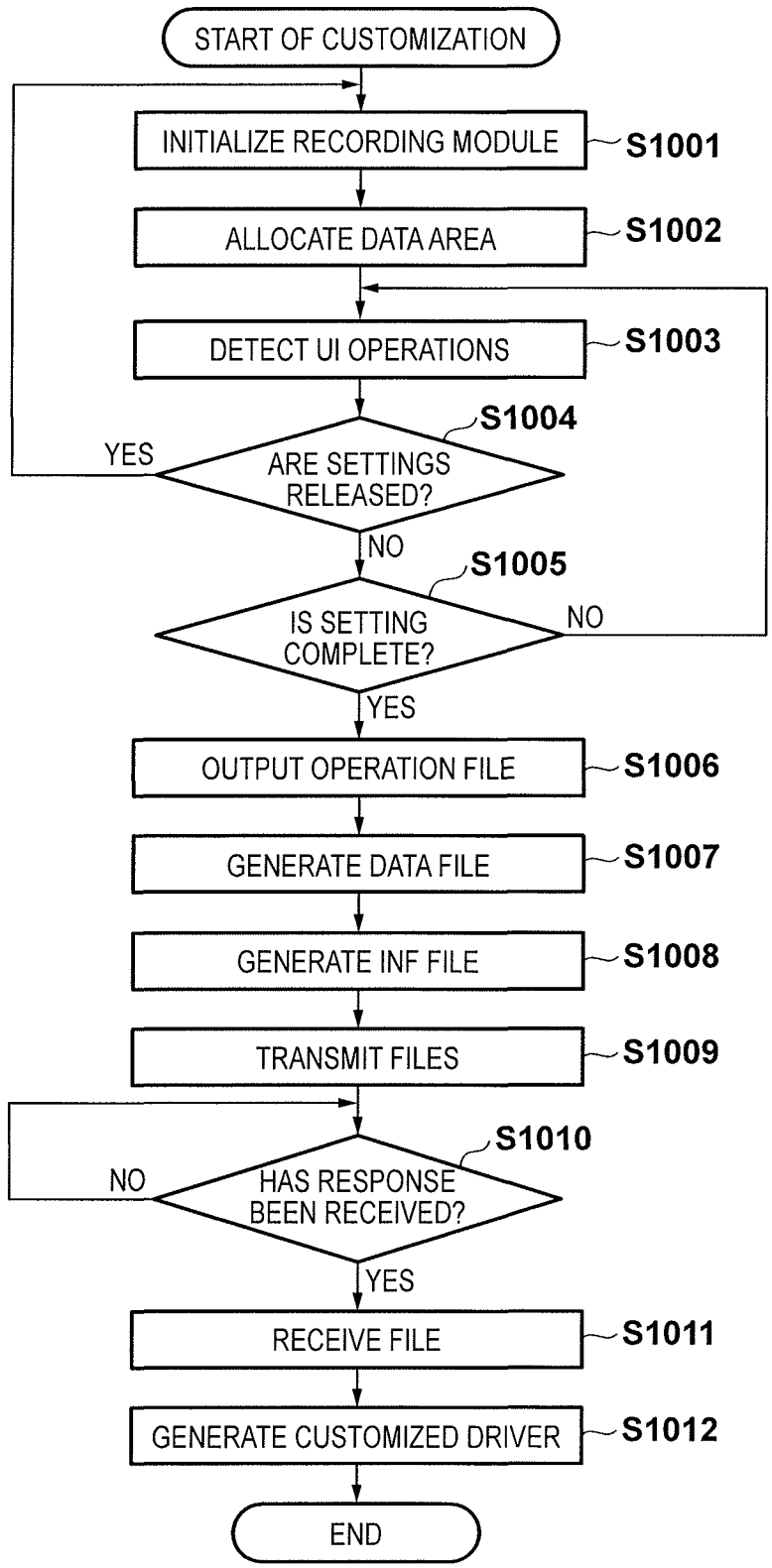
FIG. 10 is a flowchart illustrating another example of computer processing.

Another embodiment of the present invention will be described with reference to FIGS. 8, 10, and 11. In this embodiment, based on the operation history of a customization tool by the user, the server side generates a customized driver, and issues a CAT file attached with an electronic signature. Note that flowcharts of FIGS. 8 and 10 illustrate processing on the computer 3000 side and a flowchart of FIG. 11 illustrates processing on the server 4000 side.

Figure 7:
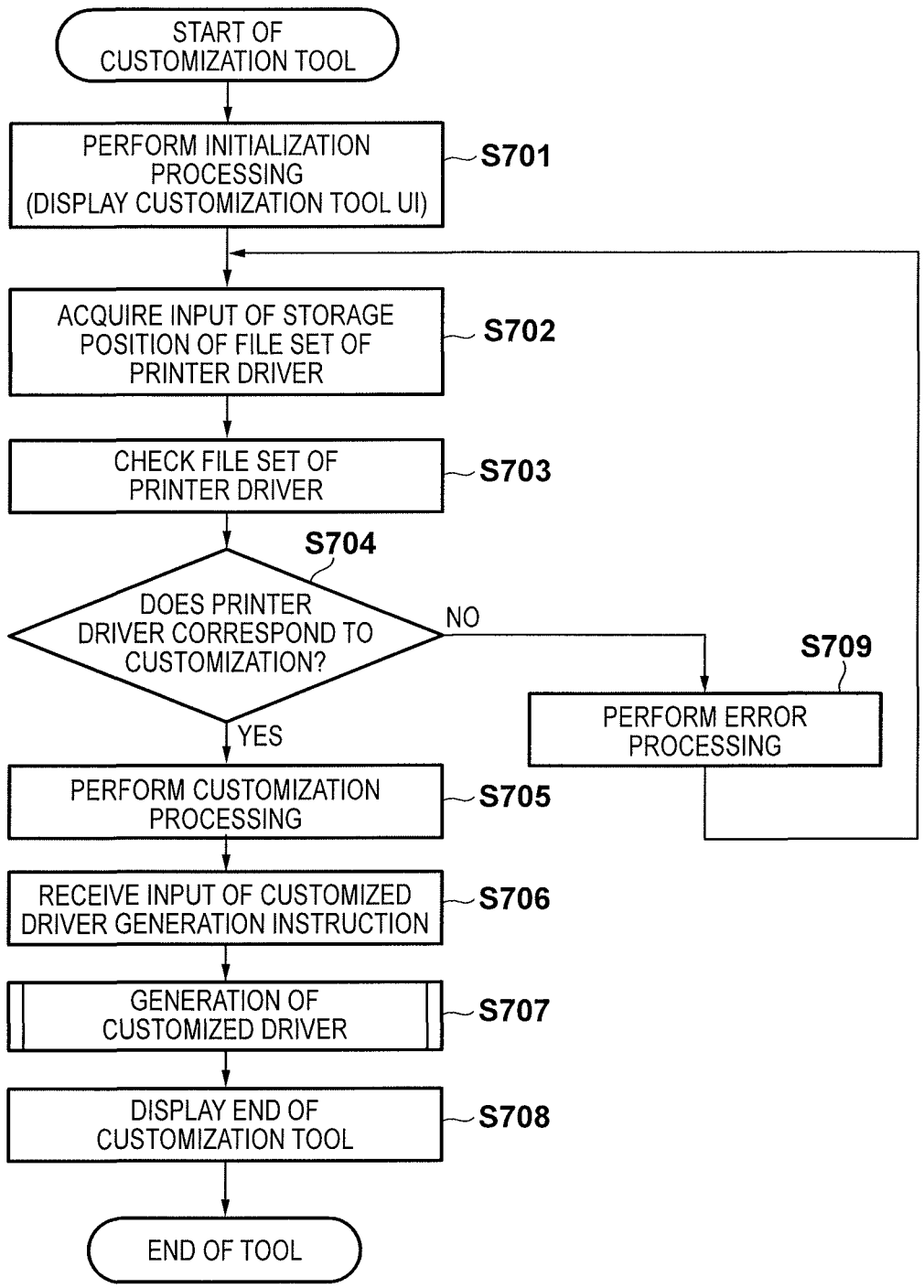
FIG. 7 is a flowchart illustrating an example of the basic operation processing of the customization tool.

In this embodiment, in step S704 of FIG. 7, the customization tool starts by loading a printer driver corresponding to customization.

Upon loading the driver corresponding to customization, the customization tool performs initialization processing for a recording module (not shown) of the customization tool (step S1001). The customization tool allocates a data area for the recording module (step S1002).

When the user starts customization setting (step S705), the customization tool detects operation contents on the UIs shown in FIGS. 4 to 6 by the user, such as options/input character strings from button operations/list boxes, and transfers them to the recording module (step S1003). The recording module holds the respective operation contents in the data area.

If a setting release button 322 is pressed during customization setting by the user, and the settings so far are cleared (YES in step S1004), the customization tool returns the process to step S1001 to initialize the recording module.

If settings are not cleared and the customization setting is complete (YES is step S1005), the customization tool outputs, as an operation file, the UI operation contents held in the data area (step S1006). Whether the customization setting is complete can be determined based on whether a generation button 340 shown in FIG. 4 has been designated.

After a customized driver generation instruction is issued, the customization tool generates a data file and INF file (steps S1007 and S1008). The customization tool acquires a CAT file included in the file set of the printer driver before customization, and transmits the CAT file and operation file to the server 4000 (step S1009). At this time, the customization tool does not transmit the data file and INF file generated in steps S1007 and S1008, respectively.

The customization tool stands by for reception of a response from the server 4000 (step S1010). Upon receiving a file generation completion notification as a response (YES in step S1010), the customization tool receives a CAT file generated in the server 4000 (step S1011). The received CAT file is a CAT file (second catalog file) which corresponds to the customized driver and has been attached with an electronic signature. Note that if an error notification is received from the server 4000, the customization tool displays it on the UI screen.

The customization tool then generates a customized driver (step S1012). At this time, the customization tool generates a customized driver by replacing the data file, INF file, and CAT file of the file set of the printer driver before customization by the data file generated in step S1007, the INF file generated in step S1008, and the CAT file received from the server 4000.

After that, the customization tool accepts an end instruction from the user, thereby terminating the flowchart.

The processing of the server 4000 will now be explained with reference to FIG. 11. The flowchart of FIG. 11 starts when a communication unit 4001 of the server 4000 receives a file from the computer 3000, similarly to the flowchart of FIG. 9 shown in the first embodiment. Processing in steps S1101 to S1103 is the same as that in steps S901 to S903 of FIG. 9 and a description thereof will be omitted.

A customized driver generation unit 4005 loads the operation file received from the computer 3000 (step S1104). According to a procedure described in the operation file, the customized driver generation unit 4005 generates a data file containing customization information and a customized INF file. The customized driver generation unit 4005 then generates a customized driver using the generated data file and INF file, and the CAT file received from the computer 3000 (step S1105). Processing after that is the same as that in steps S905 and S906 of FIG. 9 in the first embodiment and a description thereof will be omitted.

According to this embodiment, it is possible to increase the reliability of a CAT file generated on the server side when the server side receives an operation history and generates a data file and INF file.

Third Embodiment

In the above embodiments, the customization tool provided on the client side customizes the printer driver. As still another embodiment of the present invention, a case in which a customization function is provided on the server side and the user uses the function via a Web browser will be described with reference to FIG. 12.

FIG. 12 shows an example of the arrangement of a software download site UI screen displayed on the Web browser. The user selects a software category 1201 on a UI screen 1200. Then, the user selects a model 1202, OS 1203, and software 1204 as download target information. FIG. 12 shows display of a UI screen after a printer driver is selected as the software 1204, and display of the UI (customization 1206) after a customized driver is further selected. When the user selects the customization 1206 on the UI screen 1200, he/she can customize a provided existing printer driver. When the user sets contents to be customized in an editing area 1207, and selects a link "next" 1208 on the UI screen 1200, download of the software (in this example, the customized driver) designated by the user starts.

[Processing Procedure]

Internal processing on the server 4000 side will be explained with reference to FIG. 13. A processing procedure shown in FIG. 13 starts when the user accesses the software download site provided by the server 4000.

The server 4000 accepts, through the UI screen 1200, an input of a use environment such as a target model of software to be downloaded and a target OS to be installed (step S1301). When downloading the printer driver, the server 4000 accepts whether customization is necessary (step S1302). Whether customization is necessary is determined based on whether the customization 1206 of FIG. 12 has been selected. If customization is not necessary (NO in step S1302), the server 4000 displays a site for downloading a standard printer driver attached with an electronic signature (step S1309). After that, the processing procedure ends.

If customization is necessary (YES in step S1302), the server 4000 displays a customization setting UI in step S1303. In this embodiment, the editing area 1207 is displayed on the UI screen 1200. Upon accepting a customization setting input from the user, the server 4000 reads out a printer driver corresponding to designation in step S1301 from a printer driver DB 4004 (step S1304).

A customization processing unit (not shown) of the server 4000 loads the customization contents set in step S1303, and generates a customized INF file and data file (step S1305). The server 4000 then generates a customized driver using the generated various files (step S1306).

The server generates a CAT file corresponding to the generated customized driver, and attaches an electronic signature to it (step S1307). The server 4000 enables the file set of the customized driver including the CAT file and electronic signature to be downloaded from a download site, and displays the download site (step S1308). After that, the processing procedure ends.

As described above, by performing customization processing on the server side, it becomes possible to acquire a customized driver with higher reliability while reducing the load imposed when generating a customized driver.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-192293, filed Aug. 31, 2012, which is hereby incorporated by reference herein in its entirety.

What is claimed is:

1. A system in which a client and a server customize a printer driver in cooperation with each other,
said client comprising
a storage; and
a hardware processor that executes a computer program to control said client to function as:
an accepting unit configured to accept a customization setting for the printer driver,
a generation unit configured to generate customization data based on an input of the customization setting,
a communication unit configured to transmit the customization data and a first catalog file of the printer driver to said server, and receive a second catalog file as a response, and
a unit configured to generate a customized printer driver by applying the customization data to the printer driver, and attaching the second catalog file to the printer driver, and
said server comprising
a storage; and
a hardware processor that executes a computer program to control said server to function as:
a reception unit configured to receive the customization data and the first catalog file from said client,
a detection unit configured to detect a corresponding printer driver from a database using the received first catalog file as a key,
a generation unit configured to generate a customized printer driver by applying the received customization data to the printer driver detected by said detection unit,
an attachment unit configured to generate a second catalog file for the customized printer driver, and attach an electronic signature to the second catalog file, and
a unit configured to transmit the second catalog file attached with the electronic signature by said attachment unit to said client.

2. The system according to claim 1, wherein the customization data includes data indicating a content of the customization setting and data indicating printer driver installation information.

3. The system according to claim 1, wherein
the hardware processor of said client further executes a computer program to control said client to function as a holding unit configured to hold an operation history when a user inputs the customization setting,
the customization data is indicated by the operation history held in said holding unit, and
said generation unit of said server generates a customized printer driver using the operation history.

4. A system for customizing a printer driver, comprising:
a storage; and
a hardware processor that executes a computer program to control said system to function as:
an accepting unit configured to accept a customization setting for the printer driver;
a detection unit configured to detect the printer driver from a database;
a generation unit configured to generate a customized printer driver by applying the customization setting to the printer driver detected by said detection unit; and
an attachment unit configured to generate a catalog file for the customized printer driver, and attach an electronic signature to the catalog file.

5. The system according to claim 4, wherein the hardware processor executes a computer program to control the system to further function as:
a providing unit configured to provide the customized printer driver,
wherein said accepting unit and said providing unit are provided to a user via a Web browser.

6. The system according to claim 1, wherein the customization setting is a setting associated with display/non-display of a setting item on a setting screen provided by the printer driver.

7. A control method for a system in which a client and a server customize a printer driver in cooperation with each other, comprising:
in the client,
an accepting step of accepting a customization setting for the printer driver;
a generation step of generating customization data based on an input of the customization setting;
a communication step of transmitting the customization data and a first catalog file of the printer driver to the server, and receiving a second catalog file as a response; and
a step of generating a customized printer driver by applying the customization data to the printer driver, and attaching the second catalog file to the printer driver; and
in the server,
a reception step of receiving the customization data and the first catalog file from the client;
a detection step of detecting a corresponding printer driver from a database using the received first catalog file as a key;
a generation step of generating a customized printer driver by applying the received customization data to the printer driver detected in the detection step;
an attachment step of generating a second catalog file for the customized printer driver, and attaching an electronic signature to the second catalog file; and
a step of transmitting the second catalog file attached with the electronic signature in the attachment step to the client.

8. A control method for an information processing apparatus which customizes a printer driver in cooperation with a server, comprising:
an accepting step of accepting a customization setting for the printer driver;
a generation step of generating customization data based on an input of the customization setting;
a communication step of transmitting the customization data and a first catalog file of the printer driver to the server, and receiving a second catalog file as a response; and
a step of generating a customized printer driver by applying the customization data to the printer driver, and attaching the second catalog file to the printer driver.

9. A control method for an information processing apparatus which customizes a printer driver, comprising:
a reception step of receiving a first catalog file and customization data for the printer driver from a client;
a detection step of detecting a corresponding printer driver from a database using the received first catalog file as a key;
a step of generating a customized printer driver by applying the received customization data to the printer driver detected in the detection step;
an attachment step of generating a second catalog file for the customized printer driver, and attaching an electronic signature to the second catalog file; and a step of transmitting the second catalog file attached with the electronic signature in the attachment step to the client.

10. A non-transitory computer-readable medium storing a program for causing a computer to function as
   an accepting unit configured to accept a customization setting for a printer driver,
   a generation unit configured to generate customization data based on an input of the customization setting,
   a communication unit configured to transmit the customization data and a first catalog file of the printer driver to a server, and receive a second catalog file as a response, and
   a unit configured to generate a customized printer driver by applying the customization data to the printer driver, and attaching the second catalog file to the printer driver.

11. A non-transitory computer-readable medium storing a program for causing a computer to function as
   a reception unit configured to receive a first catalog file and customization data for a printer driver from a client,
   a detection unit configured to detect a corresponding printer driver from a database using the received first catalog file as a key,
   a generation unit configured to generate a customized printer driver by applying the received customization data to the printer driver detected by the detection unit,
   an attachment unit configured to generate a second catalog file for the customized printer driver, and attach an electronic signature to the second catalog file, and
   a unit configured to transmit the second catalog file attached with the electronic signature by the attachment unit to the client.

12. A non-transitory computer-readable medium storing a program for causing a computer to function as
   an accepting unit configured to accept a customization setting for a printer driver,
   a detection unit configured to detect the printer driver from a database,
   a generation unit configured to generate a customized printer driver by applying the customization setting to the printer driver detected by the detection unit, and
   an attachment unit configured to generate a catalog file for the customized printer driver, and attach an electronic signature to the catalog file.

* * * * *